Feb. 14, 1967     F. O. KRAUSE     3,303,588
ROTARY SNOW PLOW

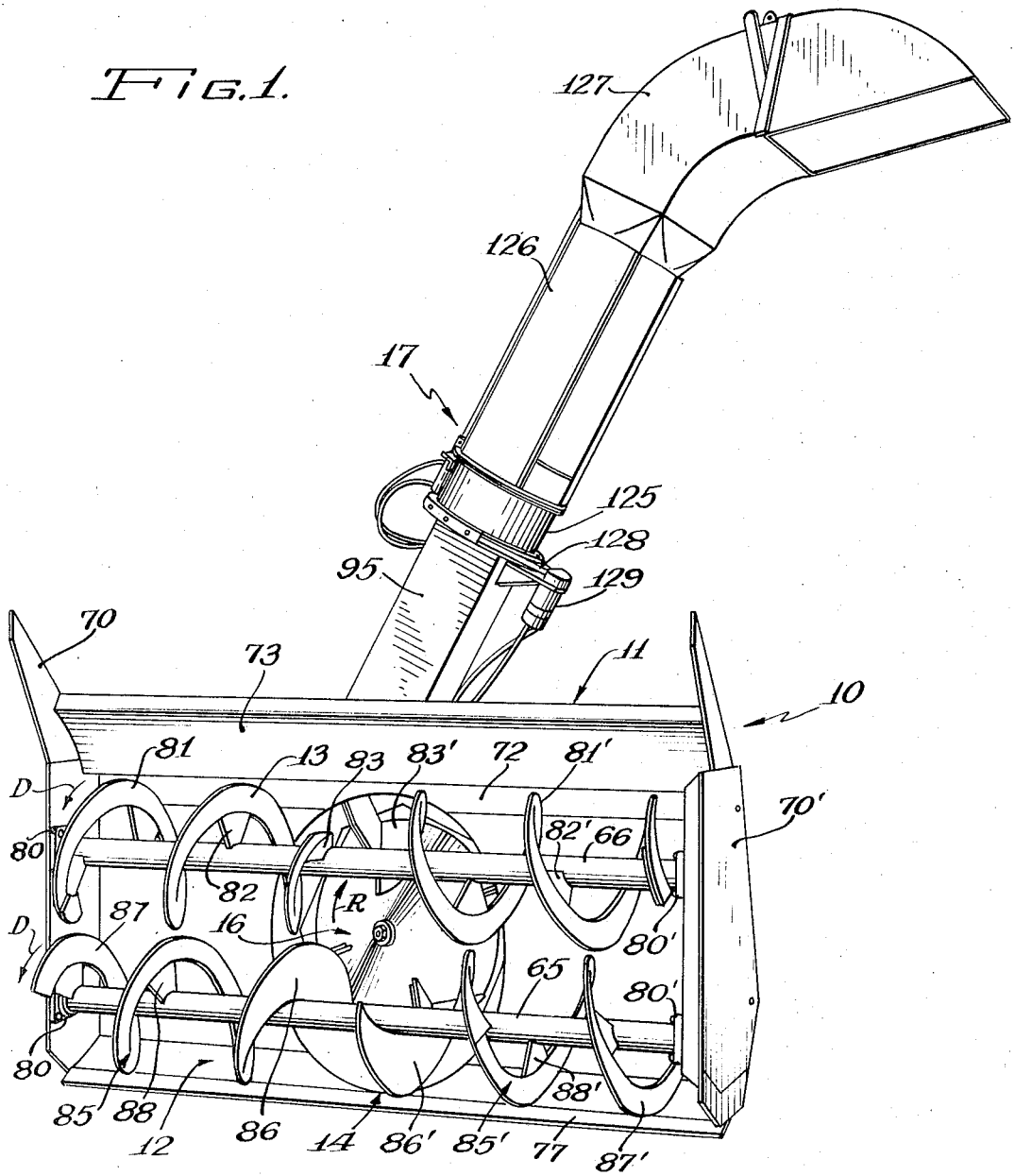

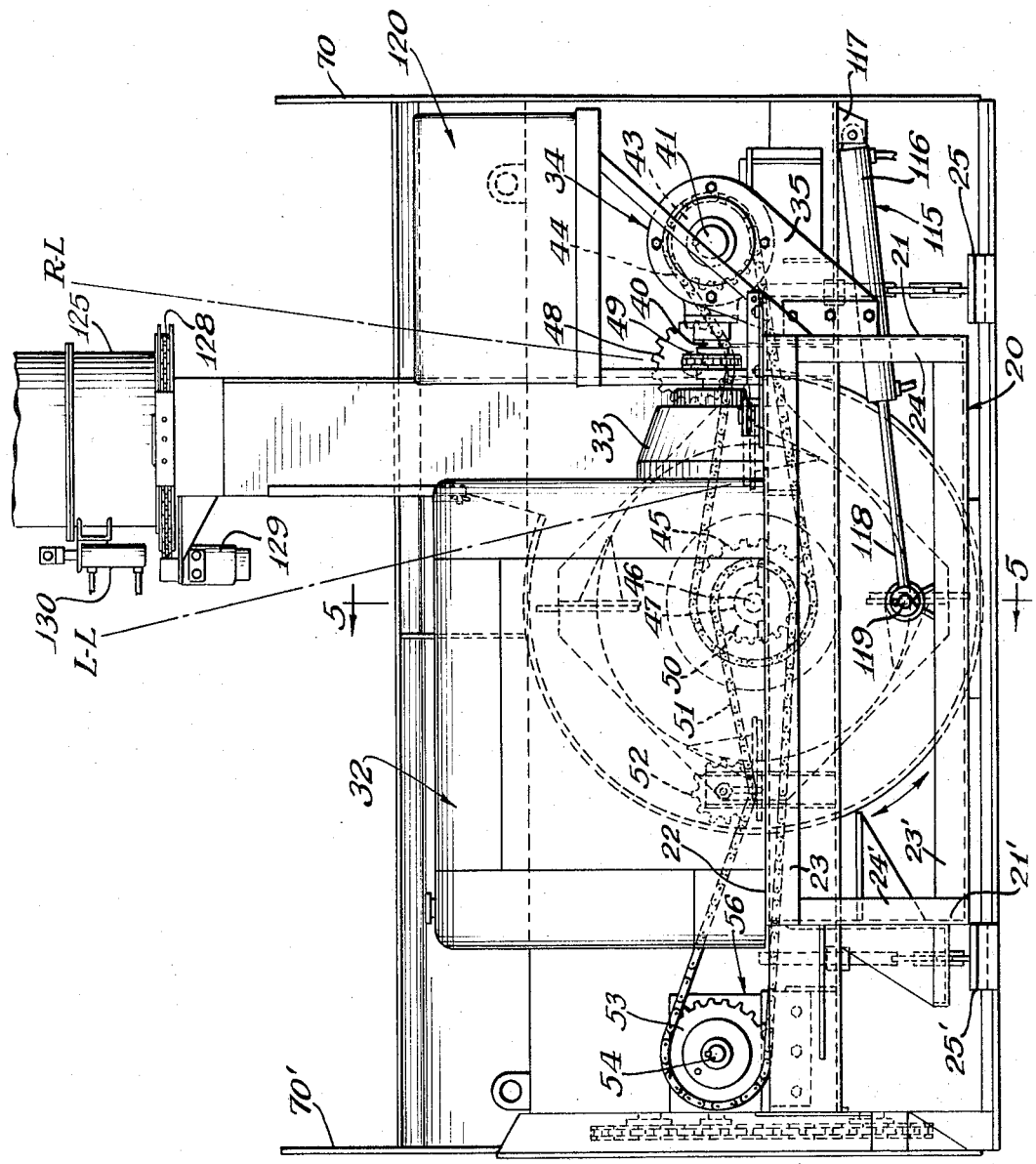

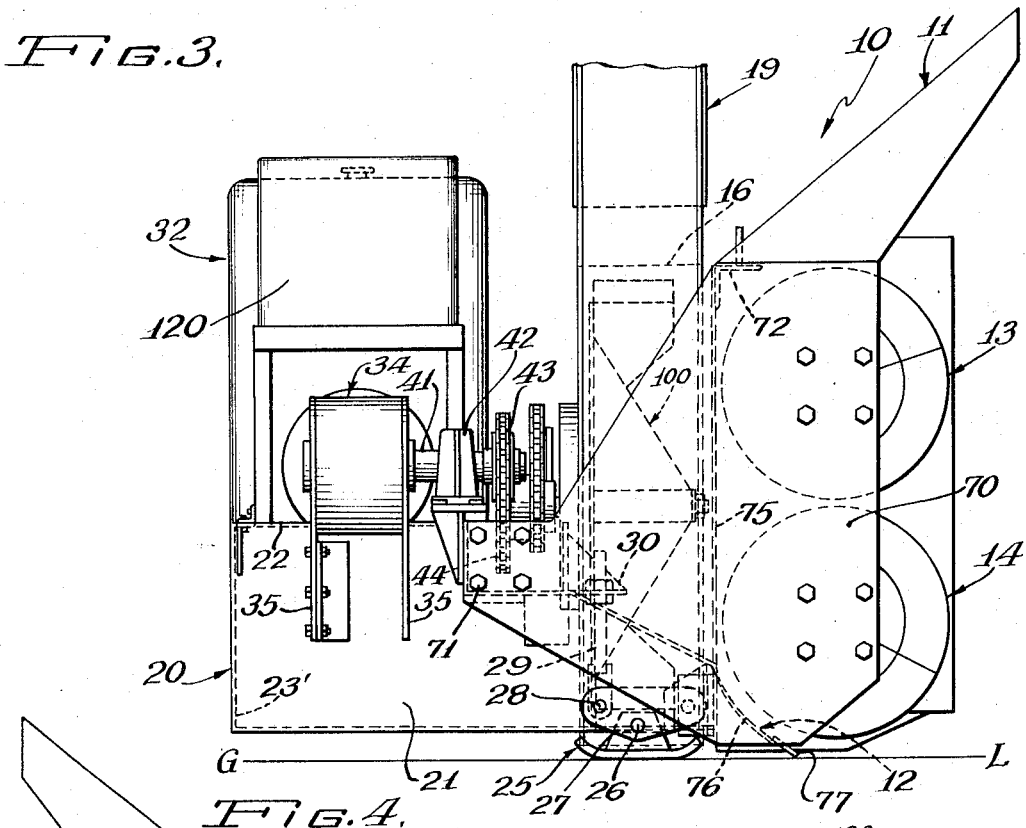
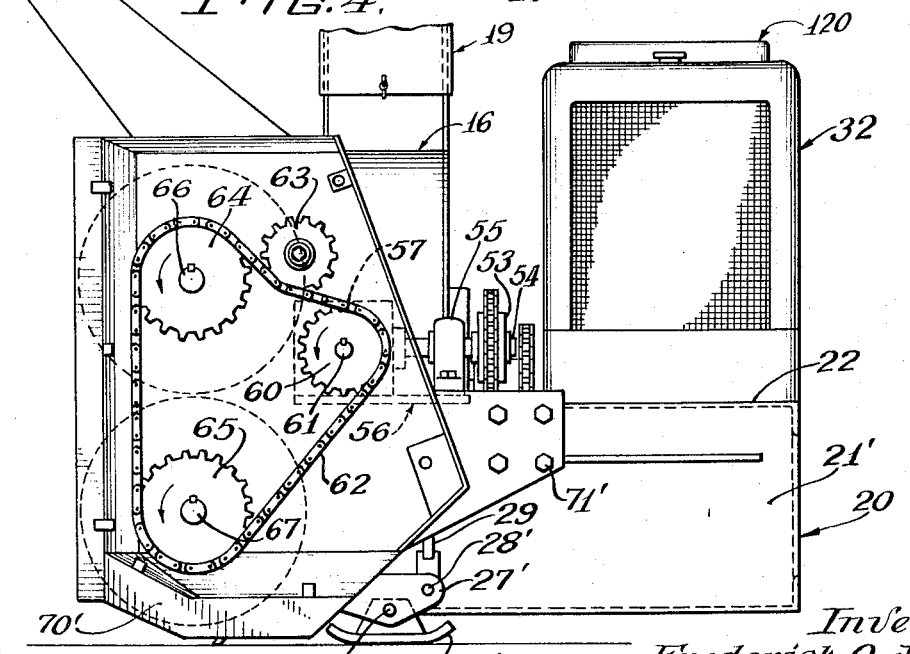

Filed Sept. 25, 1963     4 Sheets-Sheet 4

Inventor:
Frederick O. Krause
By Horton, Davis, Breuer & Brugman
Attys.

United States Patent Office 3,303,588
Patented Feb. 14, 1967

3,303,588
ROTARY SNOW PLOW
Frederick O. Krause, Wausau, Wis., assignor to Wausau Iron Works, Wausau, Wis., a corporation of Wisconsin
Filed Sept. 25, 1963, Ser. No. 311,544
2 Claims. (Cl. 37—43)

This invention relates generally to snow removal equipment and, more particularly, to improvements in rotary plows utilizing blower means in conjunction with snow gathering means for removing snow.

Rotary snow plows generally fall into two major classes, the first of which comprises a self-propelled vehicle having a so-called snow blower and snow gathering means comprising an integral forward portion of the vehicle. The second and possibly a more familiar class comprises a snow blower or rotary snow plow attachment adapted to be used in conjunction with various prime movers such as tractors or trucks; the prime mover and the plow attachment being interjoined by a suitable mounting frame and detachable mounting means. Generally this second class of rotary plows embodies a self-contained power unit for actuating the blower means thereof which is generally receptive of snow from suitable snow confronting and gathering means, such as a plow blade.

According to past known practice, the snow blower means employed in such rotary snow plows generally includes a rotatably driven impeller disposed within a substantially cylindrical blower housing to centrifugally discharge snow to a discharge chute leading somewhat tangentially upwardly and outwardly of the blower housing. This effectively directs the snow upwardly and laterally away from the path of the vehicle. Also, according to past practice, the impeller member of the snow blower has generally included plural paddle elements extending radially outwardly of a central hub by which the impeller is attached to a suitable rotatably driven shaft. Usually, the impeller is disposed coaxially of the cylindrical blower housing, with the latter being open at one end to receive snow from the snow gathering means. With such an arrangement the path of snow movement leads substantially axially into the blower housing wherein it undergoes a substantially right angular deflection for tangential discharge from a zone near the upper end of that housing according to the centrifugal force imparted thereto by the rotatably driven impeller. It has been found that this arrangement leads to marked disadvantage since the snow suffers considerable loss of momentum on making such a right angle turn, resulting in interruption of its flow outwardly of the blower housing. Additionally, past impellers have inefficiently ignored the relationship between effective paddle area and the area of the discharge opening leading from the blower housing, thereby causing considerable congestion and turbulence of the snow at its point of discharge from the blower housing. This has caused the impeller paddles to needlessly recirculate the snow along their circular orbit within the blower housing. This factor in particular has brought about inefficient clogging of the blower housing and discharge chute with attendant loss of energy, making for a poor ratio of tons of snow delivered per horsepower applied to the rotatably driven impeller. Experience has also shown that due to the poor delivery characteristics of presently known snow blowers, there is a marked tendency for the snow to tightly pack within the blower housing, obstructing movement of the impeller therein and thereby compounding energy loss and impairing operational efficiency.

The present invention is directed to improvements in snow plows of the above-discussed categories, and more particularly, to improved snow blower means therefor. This invention also concerns the improved arrangement and combination of elements, particularly snow gathering means, snow blower means and discharge means for a rotary snow plow whereby the same exhibits vastly improved operational efficiency resulting in improved delivery of snow per unit of energy applied for that purpose. In brief, the present invention comprises improved snow gathering means including a blade-type snow plow adapted to confront a quantity of snow and elevate the same upwardly and, having in conjunction therewith, one or more rotatably driven auger devices for feeding and conveying the snow gathered by the blade means toward a central zone thereof whereat the same is delivered to the snow blower. The snow blower has a rotatably driven impeller adapted to convey the snow upwardly and discharge the same tangentially outwardly of the blower housing wherefrom the snow is further delivered by chute means and discharged laterally outwardly of the snow plow. One of the more outstanding features of the present invention is found in the improved impeller for the snow blower which comprises a moving snow guide means, formed as a cone, disposed centrally of the impeller and adapted to guide and deliver snow from its conical apex in a substantially radial pattern to plural paddle members disposed at the periphery of the impeller and adjacent the base of the guide cone. This affords a substantially curvillinear path of movement for the snow so that the same is delivered to the periphery of the impeller without material loss of momentum and kinetic energy. The paddle members of the impeller are effectively sized in relation to the discharge opening of the blower housing and the discharge means leading therefrom so that all the snow gathered by each paddle member is delivered to the discharge means from the blower housing, thereby avoiding clogging, packing and recirculation of snow within the blower housing. Thus, the improved blower means of this invention substantially avoids the recirculation of snow within the blower housing by effectively providing a substantially uninterrupted flow of snow therethrough and insuring the positive delivery thereof to the discharge means.

The main object of this invention is to provide a new and improved rotary snow plow.

Another important object of this invention is to provide a new and improved rotary snow plow having means for gathering snow and delivering the same to a rotary blower which effectively discharges the snow therefrom without materially interrupting movement of snow therethrough.

Still another object of this invention is to provide a new and improved blower means for rotary snow plows having improved impeller means and snow guiding means.

Another object of this invention is to provide a new and improved rotary snow plow blower means comprising improved rotatably driven impeller means having means for guiding and directing the snow to the discharge outlet of the blower housing without materially interrupting its flow.

Still another object of this invention is to provide a new and improved rotary snow plow having improved operational efficiency whereby the same is capable of delivering increased quantities of snow with minimum energy losses.

The above and further objects, features and advantages of this invention will appear from time to time from the following description of a preferred embodiment thereof as illustrated in the accompanying drawings.

In the drawings:

FIGURE 1 is a perspective view of a rotary snow plow assembly embodying the present invention;

FIGURE 2 is a rear elevational view of the assembly illustrated in FIGURE 1 showing, in particular, drive means associated with the snow gathering and blower means thereof;

FIGURE 3 is a right-hand end view of the assembly seen in FIGURES 1 and 2;

FIGURE 4 is a left-hand end view thereof;

FIGURE 5 is a cross-sectional view taken substantially at line 5—5 of FIGURE 2 and looking in the direction of the arrows thereon; and FIGURE 6 is another cross-sectional view taken substantially along vantage line 6—6 of FIGURE 5, looking in the direction of the arrows thereon, and illustrating structural features of the improved blower means of this invention.

With reference to FIGURE 1 of the drawings, it will be understood that a rotary snow plow assembly, indicated generally by numeral 10, is therein shown to comprise snow gathering means 11 including blade means 12 and two rotatably driven and substantially horizontally disposed auger means 13, 14 extending substantially centrally across the blade means 12. Located rearwardly of the blade means and auger means is a snow blower means 16 adapted to deliver snow to an upwardly extending and adjustably movable snow discharge means 17. It will be recognized from examination of FIGURES 2, 3 and 4 of the drawings that the entire assembly 10 constitutes an attachment adapted to be mounted at the forward end of a prime mover, such as a tractor, truck or similar vehicle (not illustrated) as familiarly employed for this purpose in this art.

As shown more particularly in FIGURES 3 and 4, the snow gathering means 11 of the assembly 10 is supported at the forward snow-confronting end of a box-like main frame 20, preferably fabricated of metal to provide necessary strength and rigidity and comprising right- and left-hand planar side walls 21 and 21' respectively, and an upper mounting bed or horizontal wall 22 all supported on horizontal and vertical angle iron frame members 23, 23' and 24, 24', respectively, which are suitably interjoined to form a rectangular support structure to which the various wall members 21, 21' and 22 are attached. The snow gathering means 11 including the blade, the auger means, the snow blower means 16 and the discharge means 17 are all disposed forwardly of the main frame 20, as illustrated best in FIGURE 3. The entire assembly 10 further is supported on a pair of laterally spaced, ground-engaging shoes 25, 25' pivotally secured to opposite sides of the main frame by adjustable means including pivot pins 26, 26' connected to adjustable support links 27, 27'. Each of the links 27, 27' is pivotally supported on the main frame and pivotally connected at one end by pin means 28, 28', respectively, to the lower end of an adjustable elevating screw means 29 carried by suitable bracket 30, welded or otherwise rigidly affixed to the side walls 21, 21'; it being understood that by this arrangement each of the ground-engaging shoe means is vertically adjustable to regulate the elevation of the plow blade 12 relative to the ground line labelled GL in FIGURE 3.

Mounted on the upper wall 22 of the main frame 20 is a power unit 32, preferably comprising a gasoline-powered engine, or the like. As shown in FIGURE 2, in particular, the power unit 32 is located near one lateral margin of wall 22 and such serves to drive a clutch power take-off means 33 coupled to a right angle gear box 34 disposed outwardly of the opposite lateral margin of the top wall 22 and supported on parallel spaced angle brackets 35, 35 which are fixed to wall 21 and project angularly upwardly therefrom.

The power means 32 serves to rotatably drive a power shaft 40 coupled to an input side of the right angle gear box 34 for rotatably driving an output shaft 41 thereof which is supported by bearing means 42 disposed intermediate the ends of shaft 41, outwardly of gear box 34. Shaft 41 rotates a main drive shear pin sprocket 43 keyed thereto while the latter is coupled by chain means 44 to a driven sprocket 45 keyed to a rotatably driven impeller shaft 46 supported in suitable spaced bearing means 47, 47 as shown best in FIGURE 5. Chain 44 is also engaged by and trained about an idler sprocket 48 mounted on a vertically adjustable stub shaft 49 located between the drive and driven sprockets 43 and 45 (see FIGURE 2).

The impeller shaft 46 also is coupled to a second drive sprocket 50, adjacent sprocket 45, which serves to drive a second drive chain 51 trained over an adjustable idler sprocket 52 and a second driven shear pin sprocket 53 keyed to a take-off shaft 54 carried in bearing means 55, located adjacent the left-hand end of the main frame, as viewed in FIGURE 2. Suitable support means, indicated generally at 56, carry the bearing means 55 and shaft means 54 while the latter drives through a second right angle gear box 57 to actuate a third drive sprocket 60 mounted on shaft 61 aligned at right angles to shaft 54. Sprocket 60 motivates a chain means 62 which is trained over an idler sprocket 63 for adjusting the chain tension. A pair of driven sprockets 64 and 65 are located at the left-hand end of the snow plow and respectively keyed to auger shafts 66 and 67 whereby the auger means 13 and 14 are activated. The entire drive system above described, comprising the power unit 32 and the various shafts, gear boxes, sprockets, drive chains, etc., are hereinafter referred to generally as "drive means."

With particular reference now to FIGURES 1–4 of the drawings, it will be seen that the snow gathering means 11 comprising the plow blade 12 and the auger means 13 and 14, as previously mentioned, is supported at the forward end of the main frame 20 and to that end, the same includes a pair of laterally spaced end frame members constituting substantially trapezoidal-shaped right- and left-hand end plates 70, 70' respectively. These two end plates are affixed to opposite sides of the main frame as by bolt means 71, 71' affixed to and spaced apart by the interreaching blade means 12 and an angle iron brace member 72 extending between the upper regions thereof (see FIGURES 1 and 3). An angularly disposed shield member 73 is provided to extend outwardly of the brace 72 to prevent snow from obstructing the operator's vision.

The blade means 12 includes in its formation a straight mold board portion 75 extending vertically between the brace member 72 and the upper reaches of an under-disposed curvilinear mold board portion 76 (see FIGURE 5). The straight mold board portion has a large circular openings in its mid-region which communicates with the blower means 16, as will be described in greater detail presently. It also will be observed from FIGURES 1, 3 and 5 in particular that the curvilinear mold board portion 76 is directed forwardly of the lower end of the straight mold board portion 75 and in a generally downward direction therefrom. The lowermost edge of the curvilinear mold board further is provided with a removable ground-engaging wear blade 77 which is removably attached to the curvilinear mold board so that it may be replaced periodically to accommodate wear.

The two auger means 13 and 14, as shown best in FIGURE 1, are mounted to extend horizontally between the end plates 70, 70'; each auger means comprising a central shaft (65, 66) carried in bearings 80, 80' mounted on the opposing faces of said end plates.

Auger 13 is preferably constructed to include a pair of open or ribbon-type helical flight members 81, 81' which are fixed concentrically about shaft 66, by plural radial support arms 82, 82', respectively. It will be noted also that the adjacent ends 83, 83' of the two flight members are maintained in axial spaced relation, opposite the entry for blower means 16 which is provided in the mid-regions of the blade means 12.

Auger means 14, like auger means 13, also includes a pair of axially spaced helical flight sections 85, 85', respectively, comprising a closed flight portion 86, 86' and an open or ribbon flight portion 87, 87'. The ribbon flight portions thereof are held concentrically about shaft 65 by plural radial support arms 88, 88', while the closed flight portions thereof are fixed directly to the shaft means 65.

In operation, the auger means 13 and 14 are rotated in like rotational sense by the aforedescribed drive means, as indicated by arrow D in FIGURES 1 and 5 of the drawings. Such auger means feed snow laterally across the blade means for its entry into the blower means 16 with advancing movement of the snow plow assembly.

Blower means 16, as best illustrated in FIGURES 1, 5 and 6, comprises a substantially cylindrical blower housing 90 open at its forward end and closed over on its rearward end by wall 91. The impeller shaft 46 extends through a central axial opening 92 formed in wall 91, with such shaft and the bearing means 47, 47 therefor being carried on bracket means 93 which is fastened to the rear face of wall 91 of the blower housing and is in turn supported on the main frame 20. The cylindrical side wall 94 of the blower housing is formed integrally with a discharge chute portion 95, of substantially rectangular cross-section which projects tangentially outwardly of wall 94 and provides, at its area of junction with wall 94, a rectangular discharge opening or zone 96 for receiving snow delivered thereto from a rotatable impeller means 100 mounted coaxially within housing 90 for rotation with shaft 46 to which it is attached.

The impeller 100, as shown best in FIGURES 5 and 6, comprises a quadrangular, substantially square-shaped base plate 101, having its corners cut off for clearing wall 96 of the blower housing. A guide cone 102 is secured centrally of the base plate 101, so that its apex is disposed forwardly thereof to provide a moving guide surface in operation. A cylindrical hub member 103 extends coaxially between the apex of the guide cone and a central cylindrical recessed portion 104 of the base plate to complete the guide portion of the impeller structure; it being understood that the various parts thereof are preferably fabricated of metal and welded together to provide a rigid unification therefor.

At each corner of the base plate is a paddle member 105 which is fastened as by bolts 106 to a triangular-shaped bracket means 107 welded to the outside wall of the guide cone and the front face of the base plate substantially at their line of junction (see FIGURE 6). It will be noted that brackets 107 are faired smoothly into the surfaces of the guide cone and base plate, to one side of the paddle means 105. The latter in turn extends radially outward of the base plate 101 to closely approach the interior face of the blower housing side wall 94, thereby to effectively prevent any substantial build-up and clogging of snow between the impeller and blower housing. Importantly, the effective snow-engaging capacity or area of each such paddle means is purposely less than the area of the discharge opening 96 of the blower housing. This feature prevents build-up, clogging and recirculation of snow within the blower housing. The impeller 100 is mounted on that portion of shaft 46 which projects coaxially into the blower housing, the same being fastened to shaft 46 by key means 110 and a hub nut 111. Rotational driving of the impeller is effected by the aforedescribed drive means according to the directional arrows R shown in FIGURES 1 and 6.

Referring now to FIGURES 2 and 5 in particular, it will be recalled that bracket 93 carries the impeller shaft, impeller and blower housing and that such bracket in turn is supported at the forward end of the main frame. This permits the entire blower assembly to rotate about its central axis, which feature enables the operator to adjust the discharge means 17 to right or left of a vertical position between limits, such as are indicated by lines R—L and L—L in FIGURE 2.

To conveniently control this adjustable movement, a hydraulic actuator means, designated generally at 115, is provided adjacent the lower end of the blower housing and therebehind. One end of the hydraulic cylinder means 116 for the actuator 115 is pivotally anchored to a pad eye 117 located at a rear corner of the blade means 12 (see FIGURE 2). The hydraulic ram rod 118 of the actuator means is in turn pivotally joined to a pivot pin 119 projecting rearwardly of the lower margin of the blower housing (see FIGURES 3, 5 and 6). Suitable valving controls (not shown) are remotely located at control station 120 for the operator's convenience in selectively operating the hydraulic actuator 115.

It will be appreciated that rotational adjustment of the blower housing, as above described, serves to reposition the discharge means 17 attached thereto whereby the operator is able to regulate the discharge of snow laterally of the plow assembly. To further assist the operator in this function, the discharge means 17, which extends outwardly of and comprises therefore an extension of the discharge portion 95 associated with the blower housing, is provided with a rotatable turret means 125. The turret means is connected to and rotatably moves an overlying truck-loading chute portion 127 relative to the underlying discharge portion 95. To this end, the turret means is driven by chain drive means 128 powered off of hydraulic turret motor 129, having a control switch means 130, adjacently located.

From the foregoing, it will be recognized and appreciated by those familiar with this art that the rotary snow plow assembly of this invention exhibits an improved arrangement and structural combination of elements, distinguishing the same over previous devices of this general class. Of particular importance are the improved results and advantages obtained by the provision of the novel impeller means for the snow blower. As indicated by the several flow indicating arrows appearing in FIGURES 5 and 6 of the drawings, in operation the flow pattern for the snow fed to the intake of the blower housing by the snow gathering means undergoes very little or no violent directional change as it proceeds over the guide cone 102 to the discharge opening or zone 96. To the contrary, the directional change is gradual and generally curvilinear as dictated by the moving guide cone surface. This materially assists in preventing loss of momentum and kinetic energy for the moving snow. Also, as previously noted, each of the several paddle means 105 are limited significantly in area to less than that of the discharge opening 96. This arrangement effectively prevents the snow from clogging and building up at the discharge opening to conserve driving power applied to the impeller. As a result, the present invention provides a vastly improved mechanism for a rotary snow plow which is capable of very efficiently gathering and discharging or removing snow from its path.

While the present invention has been described hereinabove in conjunction with a preferred embodiment of its many features illustrated in the accompanying drawings, it will be appreciated that such embodiment is susceptible to various changes, modifications and substitution of equivalents without departing from the spirit and scope of this invention. It is therefore intended that this invention be unlimited by the foregoing, except as defined in the following appended claims.

I claim:

1. In a rotary snow plow the combination comprising, snow gathering means including a ground engaging snow confronting blade means and rotatably driven auger means mounted forwardly adjacent said blade means for feeding snow from opposite ends thereof laterally thereacross to a central zone thereof, said blade means having an opening at said central zone; snow blower means mounted opposite said opening and behind said blade means, said blower means comprising a substantially cylindrical housing, rotatably driven impeller means mounted coaxially within said housing and formed with a central guide means comprising a cone providing a conical guide surface, the apex of which cone is aligned coaxially of said housing and adjacent the said opening in said blade means to confront and direct substantially all snow entering said housing along a generally curvilinear path to the periphery of said impeller means, and planar paddle means mounted adjacent said periphery for receiving snow from said guide means and adapted to discharge the same tangentially through a discharge opening formed in said blower housing, the periphery of said impeller means terminating radially inwardly of the interior walls of said blower housing and said paddle means extending radially outwardly of said periphery with the effective snow engaging area of each paddle means being less than the snow receiving area of said discharge opening in said blower housing to substantially minimize recirculation of snow within the latter.

2. For use in a rotary snow plow of the type having snow confronting and gathering means adapted to feed snow to a rotary blower having a substantially cylindrical housing provided with an intake opening at one end thereof, a discharge opening in its periphery, and a rotatably driven impeller means therewithin which is capable of discharging snow through said discharge opening; an improved impeller means for the blower comprising: a substantially planar, quadrangular base plate, a conically-shaped guide means mounted centrally over said base plate with its base end engaging one surface of the latter and superposing the same substantially between the mid-points of four edges thereof to define a conical guide surface which substantially co-extensively opposes said intake opening, said conical guide surface being adapted to confront and direct substantially all of the snow entering the blower through said intake opening toward the periphery of said base plate along a substantially curvilinear flow path, plural planar paddle means attached to said guide means and base plate in transverse intersecting relationship with the plane of the latter and said guide surface, there being one said paddle means mounted at each of the four corners of said base plate and aligned along the diagonals thereof, each of said paddle means extending beyond the periphery of said base plate a distance sufficient to place the outer end thereof in close proximity with the interior walls of the blower housing, and means for rotatably driving said impeller means about an axis passing substantially centrally through said base plate and the apex of said guide means; each of said planar paddle means having a substantially smaller snow engaging area and capacity than the discharge opening for the blower housing whereby recirculation of snow by said impeller means within the blower housing is substantially prevented.

References Cited by the Examiner
UNITED STATES PATENTS

| | | | |
|---|---|---|---|
| Re. 25,071 | 10/1961 | Bucher | 37—43 |
| 443,247 | 12/1890 | Wheat | 37—43 |
| 1,837,087 | 12/1931 | Wandscheer | 37—43 |
| 2,092,536 | 9/1937 | Sicard | 37—43 |
| 2,132,790 | 10/1938 | Jeswine | 37—43 |
| 2,777,217 | 1/1957 | Klauer | 37—43 |
| 2,779,112 | 1/1957 | Garland | 37—43 |
| 2,794,271 | 6/1957 | Wallack | 37—43 |
| 3,043,028 | 7/1962 | Merry et al. | 37—43 |
| 3,222,802 | 12/1965 | Kiernan | 37—43 |

ABRAHAM G. STONE, *Primary Examiner.*

F. B. HENRY, R. L. HOLLISTER, *Assistant Examiners.*